(12) United States Patent
Ikura et al.

(10) Patent No.: US 12,495,564 B2
(45) Date of Patent: Dec. 9, 2025

(54) SEMICONDUCTOR DEVICE

(71) Applicant: FUJI ELECTRIC CO., LTD., Kawasaki (JP)

(72) Inventors: Yoshihiro Ikura, Matsumoto (JP); Seiji Noguchi, Matsumoto (JP); Yosuke Sakurai, Azumino (JP); Ryutaro Hamasaki, Matsumoto (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 427 days.

(21) Appl. No.: 18/302,773

(22) Filed: Apr. 18, 2023

(65) Prior Publication Data

US 2023/0261095 A1 Aug. 17, 2023

Related U.S. Application Data

(63) Continuation of application No. PCT/JP2021/045159, filed on Dec. 8, 2021.

(30) Foreign Application Priority Data

May 11, 2021 (JP) ................................. 2021-080625

(51) Int. Cl.
*H10D 12/00* (2025.01)
*H10D 8/00* (2025.01)
(Continued)

(52) U.S. Cl.
CPC ......... *H10D 12/481* (2025.01); *H10D 62/127* (2025.01); *H10D 62/17* (2025.01); *H10D 8/00* (2025.01)

(58) Field of Classification Search
CPC .... H10D 12/481; H10D 62/127; H10D 62/17; H10D 8/00
(Continued)

(56) References Cited

U.S. PATENT DOCUMENTS 6,392,273 B1 * 5/2002 Chang ................ H10D 62/107
257/341
2007/0267663 A1 11/2007 Harada
(Continued)

FOREIGN PATENT DOCUMENTS

JP 2007311627 A 11/2007
JP 2010225615 A 10/2010
(Continued)

OTHER PUBLICATIONS

International Search Report and (ISA/237) Written Opinion of the International Search Authority for International Patent Application No. PCT/JP2021/045159, mailed by the Japan Patent Office on Feb. 15, 2022.

*Primary Examiner* — Igwe U Anya

(57) ABSTRACT

Provided is a semiconductor device provided with a transistor section, the semiconductor device including a drift region of a first conductivity type which is provided in a semiconductor substrate, a plurality of trench portions extending from a front surface of the semiconductor substrate to the drift region, an emitter region of the first conductivity type which has a doping concentration higher than a doping concentration of the drift region and which is provided to extend from a trench portion to an adjacent trench portion among the plurality of trench portions on the front surface of the semiconductor substrate, and a trench bottom portion of a second conductivity type which is provided to a lower end of the trench portion, in which the transistor section has an electron passage region in which the trench bottom portion is not provided in a top view.

20 Claims, 13 Drawing Sheets

(51) Int. Cl.
*H10D 62/10* (2025.01)
*H10D 62/17* (2025.01)

(58) Field of Classification Search
USPC .......................................... 257/140
See application file for complete search history.

(56) References Cited

U.S. PATENT DOCUMENTS

| | | |
|---|---|---|
| 2010/0308401 A1 | 12/2010 | Atsushi |
| 2018/0240879 A1 | 8/2018 | Tolksdorf |
| 2018/0261594 A1 | 9/2018 | Yamano |
| 2019/0051648 A1 | 2/2019 | Kakimoto |
| 2019/0123186 A1 | 4/2019 | Philippou |
| 2020/0058735 A1 | 2/2020 | Naito |
| 2021/0043758 A1 | 2/2021 | Yokoyama |
| 2021/0202724 A1* | 7/2021 | Rahimo ............... H10D 62/107 |
| 2023/0071170 A1* | 3/2023 | Matsui ................. H10D 8/422 |
| 2023/0369484 A1* | 11/2023 | Takaya ................. H10D 30/60 |

FOREIGN PATENT DOCUMENTS

| | | | |
|---|---|---|---|
| JP | 2010283128 A | 12/2010 | |
| JP | 2014170780 A | 9/2014 | |
| JP | 2016523454 A | 8/2016 | |
| JP | 2017028250 A | 2/2017 | |
| JP | 2017139328 A | 8/2017 | |
| JP | 2018152426 A | 9/2018 | |
| JP | 2019091892 A | 6/2019 | |
| JP | 2021028930 A | 2/2021 | |
| WO | 2019098271 A1 | 5/2019 | |

* cited by examiner c-c'

100

SEMICONDUCTOR DEVICE

The contents of the following Japanese patent application(s) are incorporated herein by reference:
NO. 2021-080625 filed in JP on May 11, 2021
NO. PCT/JP2021/045159 filed in WO on Dec. 8, 2021

BACKGROUND

1. Technical Field

The present invention relates to a semiconductor device.

2. Related Art

Patent document 1 describes that at least a part of an IGBT cell includes an electrically floating barrier region of a second conductivity type.

LIST OF CITED REFERENCES

Patent Document

Patent Document 1: Japanese Patent Application Publication No. 2019-91892

Problems to be Solved

By providing such a barrier region to a trench portion bottom, an avalanche capability is improved, but on the other hand, an issue occurs that a transient resistance upon turning-on rises, and an on-resistance worsens.

DESCRIPTION OF EXEMPLARY EMBODIMENTS

Figure 1:
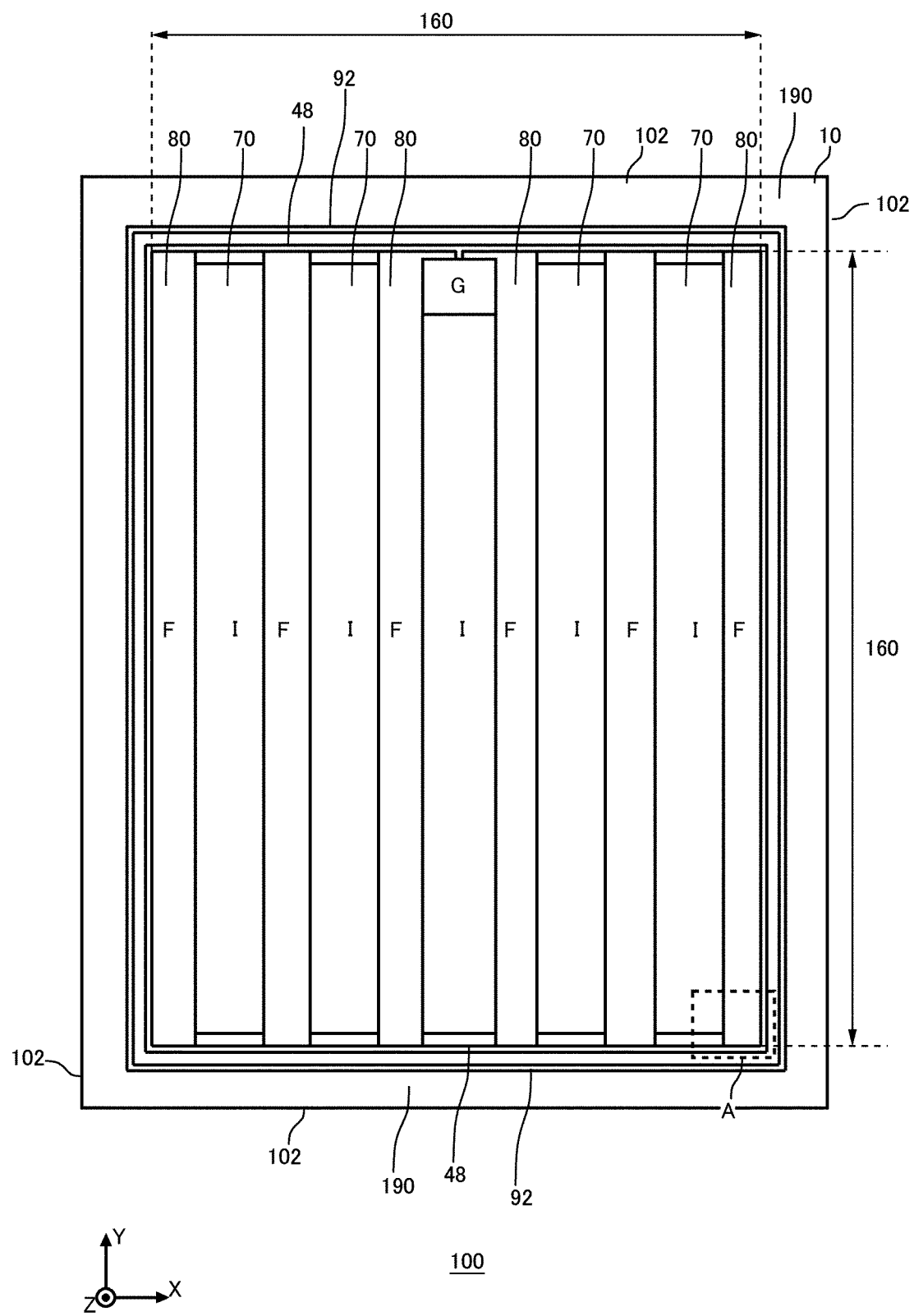
FIG. 1 illustrates an example of an upper surface of a semiconductor device 100 according to the present embodiment.

Hereinafter, the present invention will be described through embodiments of the invention, but the following embodiments do not limit the invention according to claims. In addition, not all of the combinations of features described in the embodiments are essential to the solution of the invention.

In the present specification, one side in a direction parallel to a depth direction of a semiconductor substrate is referred to as 'upper' or 'front' and the other side is referred to as 'lower' or 'rear'. One surface of two principal surfaces of a substrate, a layer, or other member is referred to as a front surface, and the other surface is referred to as a back surface. "Upper" and "lower" directions are not limited to a direction of gravity, or a direction in which a semiconductor device is mounted.

As used herein, technical matters may be described with orthogonal coordinate axes consisting of an X axis, a Y axis, and a Z axis. The orthogonal coordinate axes are merely for specifying relative positions of components, and are thus not for limiting to a specific direction. For example, the Z axis is not limited to represent a height direction with respect to the ground. Note that a +Z axis direction and a −Z axis direction are directions opposite to each other. When a direction is referred to as a "Z axis direction" without these "+" and "−" signs, it means the Z axis direction is parallel to +Z and −Z axes.

In the present specification, orthogonal axes parallel to the front surface and the back surface of the semiconductor substrate are referred to as the X axis and the Y axis. In addition, an axis perpendicular to the front surface and the back surface of the semiconductor substrate is referred to as the Z axis. As used herein, a direction of the Z axis may be referred to as a depth direction. In addition, in the present specification, a direction parallel to the front surface and the back surface of the semiconductor substrate may be referred to as a horizontal direction, including an X axis direction and a Y axis direction.

As used herein, phrases such as "same" or "equal" may be used even when there is an error caused due to a variation in a fabrication step or the like. This error is within a range of 10% or less, for example.

In the present specification, a conductivity type of a doping region where doping has been carried out with an impurity is described as a P type or an N type. In the present specification, the impurity may particularly mean either a donor of the N type or an acceptor of the P type, and may be described as a dopant. In the present specification, doping means introducing the donor or the acceptor into the semiconductor substrate and turning it into a semiconductor showing a conductivity type of the N type, or a semiconductor showing a conductivity type of the P type.

In the present specification, a doping concentration means a concentration of the donor or a concentration of the acceptor in a thermal equilibrium state. In the present specification, a net doping concentration means a net concentration obtained by adding the donor concentration set as a positive ion concentration to the acceptor concentration set as a negative ion concentration, taking polarities of charges into account. As an example, when the donor concentration is referred to as $N_D$ and the acceptor concentration is referred to as $N_A$, the net doping concentration at any position is given as $N_D-N_A$.

The donor has a function of supplying electrons to a semiconductor. The acceptor has a function of receiving electrons from the semiconductor. The donor and acceptor are not limited to the impurities themselves. For example, a VOH defect which is a combination of a vacancy (V), oxygen (O), and hydrogen (H) existing in the semiconductor functions as the donor that supplies electrons.

A P+ type or an N+ type described in the present specification means a doping concentration higher than that of the P type or the N type, and a P− type or an N− type described herein means a doping concentration lower than that of the P type or the N type. Furthermore, a P++ type or an N++ type described in the present specification means a higher doping concentration than that of the P+ type or the N+ type.

A chemical concentration in the present specification refers to the concentration of impurities, which is measured regardless of the state of electrical activation. The chemical concentration can be measured by, for example, secondary ion mass spectrometry (SIMS). The net doping concentration described above can be measured by capacitance-voltage profiling method (CV method). Furthermore, a carrier concentration measured by a spreading resistance profiling method (SR method) may be set as the net doping concentration. The carrier concentration measured by the CV method or the SR method may be set as a value in a thermal equilibrium state. Furthermore, in a region of an N type, the donor concentration is sufficiently higher than the acceptor concentration, and therefore, the carrier concentration in the region may be set as the donor concentration. Similarly, in a region of a P type, the carrier concentration in the region may be set as the acceptor concentration.

Furthermore, when a concentration distribution of the donor, acceptor, or net doping has a peak, a value of the peak may be set as the concentration of the donor, acceptor, or net doping in the region. When the concentration of the donor, acceptor, or net doping is approximately uniform in a region, or the like, an average value of the concentration of the donor, acceptor, or net doping in the region may be set as the concentration of the donor, acceptor, or net doping.

The carrier concentration measured by the SR method may be lower than the concentration of the donor or the acceptor. In a range where a current flows when a spreading resistance is measured, the carrier mobility of the semiconductor substrate may be lower than a value of that in a crystalline state. The fall in carrier mobility occurs when carriers are scattered due to disorder (disorder) of a crystal structure due to a lattice defect or the like.

The concentration of the donor or the acceptor calculated from the carrier concentration measured by the CV method or the SR method may be lower than a chemical concentration of an element representing the donor or the acceptor. As an example, in a silicon semiconductor, a donor concentration of phosphorus or arsenic serving as a donor or an acceptor concentration of boron (boron) serving as an acceptor is substantially 99% of chemical concentrations of these. On the other hand, in the silicon semiconductor, a donor concentration of hydrogen serving as a donor is approximately 0.1% to 10% of a chemical concentration of hydrogen.

FIG. 1 illustrates an example of an upper surface of a semiconductor device 100 according to the present embodiment. FIG. 1 illustrates a position of each member as being projected onto a front surface of a semiconductor substrate 10. In FIG. 1, only some members of the semiconductor device 100 are illustrated, and illustrations of some members are omitted.

The semiconductor device 100 includes the semiconductor substrate 10. The semiconductor substrate 10 has an end side 102 in a top view. As simply used herein, unless otherwise specified, a top view means a view from the side of the front surface of the semiconductor substrate 10. The semiconductor substrate 10 of the present example includes two sets of end sides 102 facing each other in a top view. In FIG. 1, the X axis and the Y axis are parallel to any of end sides 102. In addition, the Z axis is perpendicular to the front surface of the semiconductor substrate 10.

The semiconductor substrate 10 is provided with an active section 160. The active section 160 is a region where a principal current flows in the depth direction between the front surface and the back surface of the semiconductor substrate 10 when the semiconductor device 100 operates. An emitter electrode is provided above the active section 160, but is omitted in FIG. 1.

The active section 160 is provided with at least one of a transistor section 70 including a transistor element such as an IGBT, or a diode section 80 including a diode element such as a free wheeling diode (FWD). In the example of FIG. 1, the transistor section 70 and the diode section 80 are alternately arranged along a predetermined array direction (X axis direction in the present example) in the front surface of the semiconductor substrate 10. In another example, only the transistor section 70 may be provided to the active section 160.

In FIG. 1, a region where each of the transistor sections 70 is arranged is represented by a symbol "I", and a region where each of the diode sections 80 is arranged is represented by a symbol "F". In the present specification, a direction perpendicular to the array direction in a top view may be referred to as an extending direction (the Y axis direction in FIG. 1). Each of the transistor sections 70 and the diode sections 80 may have a longitudinal length in the extending direction. In other words, the length of each of the transistor sections 70 in the Y axis direction is larger than the width in the X axis direction. Similarly, the length of each of the diode sections 80 in the Y axis direction is larger than the width in the X axis direction. The extending direction of the transistor section 70 and the diode section 80, and the longitudinal direction of each trench portion described below may be the same.

The transistor section 70 includes a collector region of a P+ type in a region in contact with the back surface of the semiconductor substrate 10. The diode section 80 has a cathode region of an N+ type in a region in contact with the back surface of the semiconductor substrate 10. In the present specification, a region where the collector region is provided is referred to as the transistor section 70. That is, the transistor section 70 is a region which overlaps the collector region in a top view.

A cathode region of an N+ type may be provided in a region other than the collector region to the back surface of the semiconductor substrate 10. In the present specification, a cathode region is provided to a lower surface of an extension region where the transistor section 70 extends in the Y axis direction up to a gate runner described below. In the present specification, the extension region is included in the diode section 80. Furthermore, in the transistor section 70, an emitter region of an N type, a base region of a P type, and a gate structure having a gate conductive portion and a gate dielectric film are periodically arranged on the front surface side of the semiconductor substrate 10.

The semiconductor device 100 may have one or more pads above the semiconductor substrate 10. As an example, the semiconductor device 100 illustrated in FIG. 1 has a gate pad G, which is, however, only an example. The semiconductor device 100 may have a pad such as an anode pad, a cathode pad, and a current detection pad. Each pad is arranged in the vicinity of the end side 102. The vicinity of the end side 102 refers to a region between the end side 102 and the emitter electrode in a top view. When the semiconductor device 100 is mounted, each pad may be connected to an external circuit via a wiring such as a wire.

A gate potential is applied to the gate pad G. The gate pad G is electrically connected to a conductive portion of a gate trench portion of the active section 160. The semiconductor device 100 includes a gate runner 48 configured to electrically connect the gate pad G and the gate trench portion.

The gate runner 48 is arranged between the active section 160 and the end side 102 of the semiconductor substrate 10 in a top view. The gate runner 48 of the present example surrounds the active section 160 in a top view. A region surrounded by the gate runner 48 in a top view may be set as the active section 160.

The gate runner 48 is arranged above the semiconductor substrate 10. The gate runner 48 of the present example may be formed of polysilicon doped with impurities, or the like. The gate runner 48 is electrically connected to the gate conductive portion provided inside the gate trench portion via a gate dielectric film.

The semiconductor device 100 in the present example includes an edge termination structure section 190 provided to an outer circumference of the active section 160. The edge termination structure section 190 of the present example is arranged between the gate runner 48 and the end side 102. The edge termination structure section 190 mitigates electric field strength on the front surface side of the semiconductor substrate 10.

The edge termination structure section 190 may have a guard ring 92. The guard ring 92 is a region of a P type in contact with the front surface of the semiconductor substrate 10. Note that the edge termination structure section 190 of the present example has a plurality of guard rings 92, which are omitted in FIG. 1, but only the single guard ring 92 is illustrated. By providing the plurality of guard rings 92, the depletion layer on the upper surface side of the active section 160 can be extended outward, and a breakdown voltage of the semiconductor device 100 can be improved. The edge termination structure section 190 may further include at least one of a field plate annularly provided to surround the active section 160 or a resurf.

Furthermore, the semiconductor device 100 may include a temperature sensing unit (not illustrated) that is a PN junction diode formed of polysilicon or the like, and a current detection unit (not illustrated) configured to simulate an operation of the transistor section provided in the active section 160.

Figure 2A:
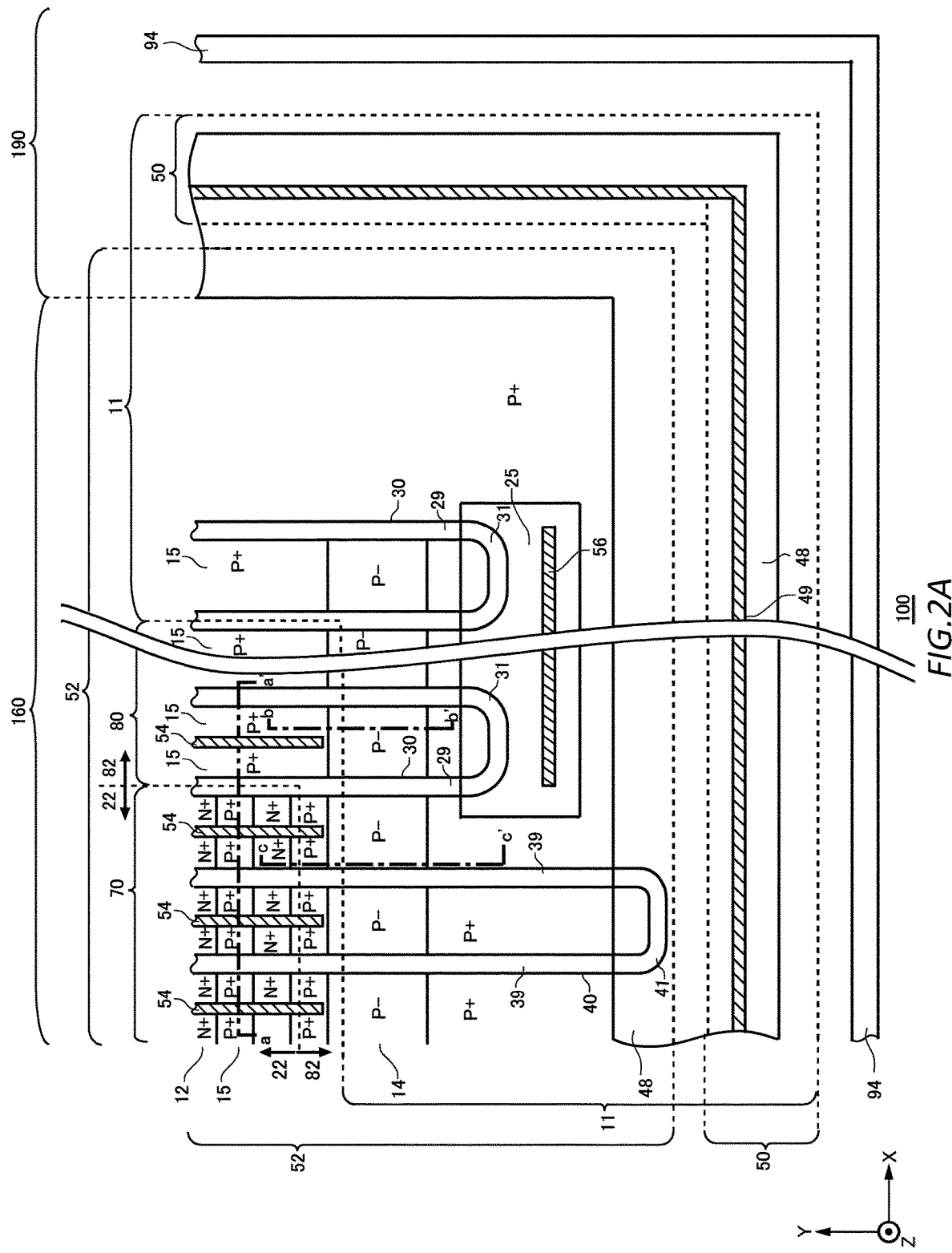
FIG. 2A is an enlarged view representing an example of the upper surface of the semiconductor device 100.

FIG. 2A is an enlarged view representing an example of the upper surface of the semiconductor device 100. FIG. 2A illustrates a region A illustrated in FIG. 1, that is, a vicinity of the boundary between the active section 160 and the edge termination structure section 190. The semiconductor device 100 is provided with the semiconductor substrate having the transistor section 70 including a transistor element such as an IGBT and the diode section 80 including a diode element such as a free wheeling diode (FWD).

The transistor section 70 and the diode section 80 of the present example are alternately arranged along the array direction (X axis direction in the present example). The diode section 80 is provided between the transistor section 70 in proximity to the edge termination structure section 190, and the edge termination structure section 190 in a top view. That is, the diode section 80 is arranged on an outermost side of the active section 160. Note that when terms "inner" and "outer" are simply used in the present specification, a direction towards a center of the semiconductor device 100 refers to inner, and a direction away from the center refers to outer.

The semiconductor device 100 of the present example includes a gate trench portion 40, a dummy trench portion 30, a well region 11, an emitter region 12, a base region 14, and a contact region 15 which are provided on the front surface side of the semiconductor substrate. The gate trench portion 40 and the dummy trench portion 30 each are an example of the trench portion.

In addition, the semiconductor device 100 in the present example includes a gate metal layer 50 and an emitter electrode 52 which are provided above the front surface of the semiconductor substrate. The gate metal layer 50 and the emitter electrode 52 are provided to be separated from each other. The gate metal layer 50 and the emitter electrode 52 are electrically insulated.

An interlayer dielectric film is provided between the emitter electrode 52 and the gate metal layer 50 and the front surface of the semiconductor substrate, but is omitted in FIG. 2A. In the interlayer dielectric film of the present example, contact holes 49, 54, and 56 are provided penetrating through the interlayer dielectric film. In FIG. 2A, each contact hole is hatched with oblique lines.

The emitter electrode 52 is provided above the gate trench portion 40, the dummy trench portion 30, the well region 11, the emitter region 12, the base region 14, and the contact region 15. The emitter electrode 52 is electrically connected to the emitter region 12, the base region 14, and the contact region 15 for the front surface of the semiconductor substrate through the contact hole 54.

In addition, the emitter electrode 52 is connected to a dummy conductive portion in the dummy trench portion 30 by the contact hole 56. A connection portion 25 formed of a conductive material such as polysilicon doped with impurities may be provided between the emitter electrode 52 and the dummy conductive portion. The connection portion 25 is provided to the front surface of the semiconductor substrate via a dielectric film such as an interlayer dielectric film and a dummy dielectric film of the dummy trench portion 30.

The gate metal layer 50 is electrically connected to the gate runner 48 through the contact hole 49. The gate runner 48 may be formed of polysilicon doped with impurities, or the like. The gate runner 48 is connected to a gate conductive portion in the gate trench portion 40 in the front surface of the semiconductor substrate. The gate runner 48 is not electrically connected to the dummy conductive portion in the dummy trench portion 30 and the emitter electrode 52.

The gate runner 48 and the emitter electrode 52 are electrically separated by an insulating material such as an interlayer dielectric film and an oxide film. The gate runner 48 of the present example is provided from a position below the contact hole 49 to edge portions of the gate trench portions 40. At the edge portion of the gate trench portion 40, the gate conductive portion is exposed at the front surface of the semiconductor substrate to be connected to the gate runner 48.

The emitter electrode 52 and the gate metal layer 50 are formed of a conductive material containing metal. For example, the emitter electrode and the gate metal layer are formed of an alloy containing aluminum or aluminum as a main component (for example, an aluminum-silicon alloy or the like). Each electrode may have a barrier metal formed of titanium, a titanium compound, or the like as an underlying layer of a region formed of aluminum or the like.

Each electrode may have a plug formed of tungsten or the like in the contact hole. The plug may have a barrier metal on a side in contact with the semiconductor substrate and have tungsten embedded to be in contact with the barrier metal, and may be formed of aluminum or the like on tungsten.

Note that the plug is provided in the contact hole in contact with the contact region 15 or the base region 14. In addition, a plug region of a P++ type is formed under the contact hole of the plug, and has a doping concentration higher than that of the contact region 15. This can improve a contact resistance between the barrier metal and the contact region 15. Furthermore, a depth of the plug region is about 0.1 μm or less, and has a small region with a depth that is 10% or less of that of the contact region 15.

A plug region has following features. In an operation of the transistor section 70, a latch-up resistance is improved by improvement on the contact resistance. On the other hand, in an operation of the diode section 80, when the plug region dose not exist, a contact resistance between the barrier metal and the base region 14 is high, and a conduction loss and a switching loss rise. However, with the provision of the plug region, the rise in the conduction loss and the switching loss can be suppressed.

The well region 11 overlaps the gate runner 48 to extend in the outer circumference of the active section 160, and is annularly provided in a top view. The well region 11 extends in a predetermined width even in a range without overlapping the gate runner 48, and is annularly provided in a top view. The well region 11 of the present example is provided away from the end of the contact hole 54 in the Y axis direction towards the gate runner 48. The well region 11 is a region of a second conductivity type in which the doping concentration is higher than the base region 14. The gate runner 48 is electrically insulated from the well region 11.

The base region 14 of the present example is a P− type, and the well region 11 is a P+ type. In addition, the well region 11 is formed from the front surface of the semiconductor substrate to a position deeper than a lower end of the base region 14. The base region 14 is provided in contact with the well region 11 in the transistor section 70 and the diode section 80. Therefore, the well region 11 is electrically connected to the emitter electrode 52.

Each of the transistor section 70 and the diode section 80 includes a plurality of trench portions arranged in the array direction. In the transistor section 70 of the present example, one or more gate trench portions 40 are provided along the array direction. In the diode section 80 of the present example, the plurality of dummy trench portions 30 are provided along the array direction. In the diode section 80 of the present example, the gate trench portion 40 is not provided.

The gate trench portion 40 of the present example may have two linear segments 39 extending along the extending direction perpendicular to the array direction (portions of a trench that are linear along the extending direction), and the edge portion 41 connecting the two linear segments 39.

At least a part of the edge portion 41 may be provided in a curved shape in a top view. The edge portion 41 connects the end portions of the two linear segments 39 in the Y axis direction to the gate runner 48, which functions as a gate electrode to the gate trench portion 40. On the other hand, by forming the edge portion 41 into a curved shape, electric field strength at the end portions can be further reduced as compared with a case where the gate trench portion is completed with the linear segments 39.

In another example, one or more gate trench portions 40 and one or more dummy trench portions 30 may be alternately provided along the array direction in the transistor section 70. In the transistor section 70, the dummy trench portion 30 is provided between the respective linear segments 39 of the gate trench portion 40. Between the respective linear segments 39, one dummy trench portion 30 may be provided, or a plurality of dummy trench portions 30 may be provided.

The dummy trench portion 30 may not be provided between the respective linear segments 39, and the gate trench portion 40 may be provided therebetween. With such a structure, the electron current from the emitter region 12 can be increased, so that an ON voltage is reduced.

The dummy trench portion 30 may have a linear shape extending in the extending direction, and may have linear segments 29 and an edge portion 31, similar to the gate trench portion 40. In the semiconductor device 100 illustrated in FIG. 2A, only the dummy trench portions 30 having the edge portions 31 are arrayed. However, in another example, the semiconductor device 100 may include the linear dummy trench portion 30 without the edge portion 31.

A diffusion depth of the well region 11 may be deeper than the depth of the gate trench portion 40 and the dummy trench portion 30. The end portions in the Y axis direction of the gate trench portion 40 and the dummy trench portion 30 are provided in the well region 11 in a top view. In other words, the bottom in the depth direction of each trench portion is covered with the well region 11 at the end portion in the Y axis direction of each trench portion. In addition, the trench portion provided at the end portion in the X axis direction may be covered with the well region 11. With this configuration, the electric field strength in the bottom of each trench portion can be reduced.

A mesa portion is provided between the respective trench portions in the array direction. The mesa portion refers to a region sandwiched between the trench portions inside the semiconductor substrate. As an example, a depth position of the mesa portion is from the front surface of the semiconductor substrate to a lower end of the trench portion.

The mesa portion of the present example is sandwiched between the adjacent trench portions in the X axis direction, and is provided extending in the extending direction (Y axis direction) along the trench in the front surface of the semiconductor substrate. As will be described below with reference to FIG. 2B, in the present example, the transistor section 70 is provided with a mesa portion 60, and the diode section 80 is provided with a mesa portion 61. In the case of simply mentioning "mesa portion" in the present specification, the portion refers to each of the mesa portion 60 and the mesa portion 61.

Each mesa portion is provided with the base region 14. In each mesa portion, at least one of the emitter region 12 of the first conductivity type or the contact region 15 of the second conductivity type may be provided in a region sandwiched between the base regions 14 in a top view. The emitter region 12 of the present example is an N+ type, and the contact region 15 is a P+ type. The emitter region 12 and the contact region 15 may be provided between the base region 14 and the front surface of the semiconductor substrate in the depth direction.

The mesa portion of the transistor section 70 has an emitter region 12 exposed at the front surface of the semiconductor substrate. The emitter region 12 is provided in contact with the gate trench portion 40. The mesa portion in contact with the gate trench portion 40 is provided with the contact region 15 exposed at the front surface of the semiconductor substrate.

Each of the contact region 15 and the emitter region 12 in the mesa portion is provided from one trench portion to the other trench portion in the X axis direction. As an example, the contact region 15 and the emitter region 12 in the mesa portion are alternately arranged along the extending direction of the trench portion (the Y axis direction).

In another example, the contact region 15 and the emitter region 12 in the mesa portion may be provided in a stripe shape along the extending direction of the trench portion (the Y axis direction). For example, the emitter region 12 is provided in a region in contact with the trench portion, and the contact region 15 is provided in a region sandwiched between the emitter regions 12.

The emitter region 12 is not provided in the mesa portion of the diode section 80. An upper surface of the mesa portion of the diode section 80 may be provided with the base region 14. The base region 14 may be arranged in the entire mesa portion of the diode section 80.

The contact hole 54 is provided above each mesa portion. The contact hole 54 is arranged in a region sandwiched between the base regions 14 in its extending direction (Y axis direction). The contact hole 54 of the present example is provided above each region of the contact region 15, the base region 14, and the emitter region 12. The contact hole 54 may be arranged at the center of the mesa portion in the array direction (the X axis direction).

In the diode section 80, a region adjacent to the back surface of the semiconductor substrate is provided with a cathode region 82 of an N+ type. In the back surface of the semiconductor substrate, a region in which the cathode region 82 is not provided may be provided with a collector region 22 of a P+ type. In FIG. 2A, a boundary between the cathode region 82 and the collector region 22 is represented by a dotted line. In the edge termination structure section 190 too, the cathode region 82 of an N+ type may be provided on the back surface side of the semiconductor substrate.

Figure 2B:
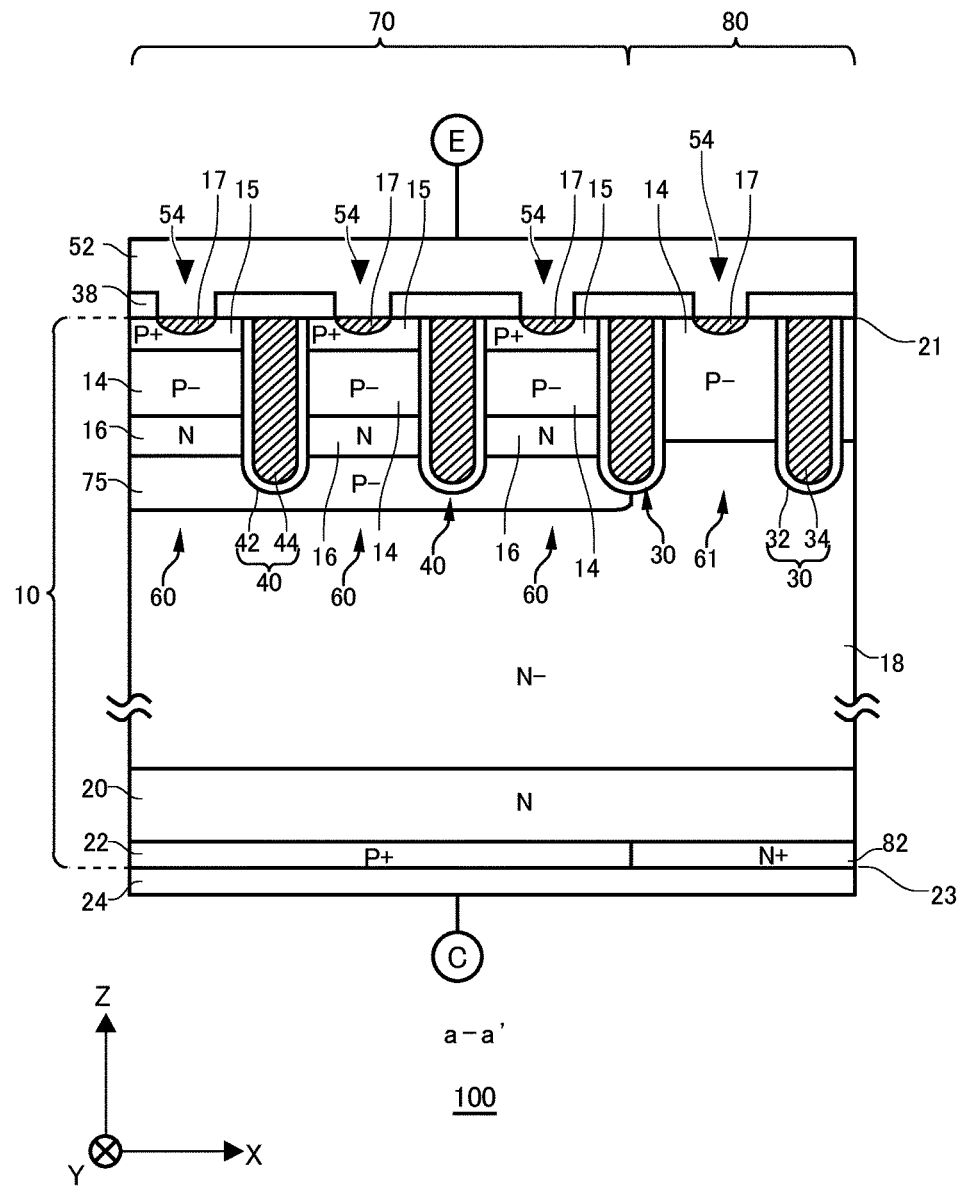
FIG. 2B illustrates a cross section a-a' in FIG. 2A.

FIG. 2B illustrates a cross section a-a' in FIG. 2A. The cross section a-a' is an XZ plane passing through the contact region 15 and the base region 14, and also through the gate trench portion 40 and the dummy trench portion 30. The semiconductor device 100 in the present example has the semiconductor substrate 10, an interlayer dielectric film 38, the emitter electrode 52, and the collector electrode 24 on the cross section a-a'.

The interlayer dielectric film 38 is provided to a front surface 21 of the semiconductor substrate 10. The interlayer dielectric film 38 is a dielectric film such as silicate glass added with impurities of, for example, boron, phosphorus, or the like. The interlayer dielectric film 38 may be in contact with the front surface 21, and another film such as an oxide film may be provided between the interlayer dielectric film 38 and the front surface 21. The interlayer dielectric film 38 is provided with the contact hole 54 described with reference to FIG. 2A.

The emitter electrode 52 is provided to the front surface 21 of the semiconductor substrate 10 and an upper surface of the interlayer dielectric film 38. The emitter electrode 52 is electrically connected to the front surface 21 through the contact hole 54 of the interlayer dielectric film 38. The plug region 17 of tungsten (W) or the like may be provided inside the contact hole 54. The collector electrode 24 is provided to a back surface 23 of the semiconductor substrate 10. The emitter electrode 52 and the collector electrode 24 are formed of a material including metal or a laminated film thereof.

The semiconductor substrate 10 may be a silicon substrate, may be a silicon carbide substrate, or may be a nitride semiconductor substrate such as gallium nitride, or the like. In the present example, the semiconductor substrate 10 is a silicon substrate.

The semiconductor substrate 10 has a drift region 18 of a first conductivity type. The drift region 18 of the present example is of an N− type. The drift region 18 may be a remaining region in the semiconductor substrate 10 in which the other doping regions have not been provided.

In the transistor section 70, one or more accumulation regions 16 may be provided above the drift region 18 in the Z axis direction. The accumulation region 16 is a region where the same dopant as that of the drift region 18 is accumulated at a higher concentration than the drift region 18. The doping concentration of the accumulation region 16 is higher than the doping concentration of the drift region 18.

The accumulation region 16 of the present example is an N type. The accumulation region 16 may be provided between the base region 14 and a trench bottom portion 75 which will be described below in the transistor section 70. The accumulation region 16 may be provided only in the transistor section 70, or may be provided in both the transistor section 70 and the diode section 80. With the provision of the accumulation region 16, it is possible to increase an injection enhancement effect (IE effect) of the carrier so as to lower the ON voltage.

In the transistor section 70, the emitter region 12 is provided in contact with the front surface 21 above the base region 14. The emitter region 12 is provided in contact with the gate trench portion 40. The doping concentration of the emitter region 12 is higher than the doping concentration of the drift region 18. Examples of the dopant of the emitter region 12 include arsenic (As), phosphorus (P), antimony (Sb), and the like.

The diode section 80 is provided with the base region 14 exposed at the front surface 21. The base region 14 of the diode section 80 operates as an anode.

The buffer region 20 of a first conductivity type may be provided below the drift region 18. The buffer region 20 of the present example is an N type. The doping concentration of the buffer region 20 is higher than the doping concentration of the drift region 18. The buffer region 20 may function as a field stopper layer configured to prevent a depletion layer expanding from a lower surface side of the base region 14 from reaching the collector region 22 and the cathode region 82.

In the transistor section 70, the collector region 22 is provided below the buffer region 20. The collector region 22 may be provided in contact with the cathode region 82 in the back surface 23.

In the diode section 80, the cathode region 82 is provided below the buffer region 20. The cathode region 82 may be provided at the same depth of that of the collector region 22 of the transistor section 70. The diode section 80 may function as a free wheeling diode (FWD) which allows the free wheeling current to flow in the reverse direction when the transistor section 70 is turned off.

The semiconductor substrate portion 10 is provided with the gate trench portion 40 and the dummy trench portion 30. The gate trench portion 40 and the dummy trench portion 30 are provided to penetrate the base region 14 and the accumulation region 16 from the front surface 21 and reach the drift region 18. The configuration of the trench portion penetrating the doping region is not limited to that fabricated in the order of forming the doping region and then forming the trench portion. The configuration of the trench portion penetrating the doping region also includes a configuration of the doping region being formed between the trench portions after forming the trench portion.

The gate trench portion 40 includes a gate trench provided in the front surface 21, a gate dielectric film 42, and a gate conductive portion 44. The gate dielectric film 42 is provided to cover the inner wall of the gate trench. The gate dielectric film 42 may be formed of an oxide film or a nitride film. The gate conductive portion 44 is provided to embed an inner side relative to the gate dielectric film 42 inside the gate trench. An upper surface of the gate conductive portion 44 may be in the same XY plane as the front surface 21. The gate dielectric film 42 insulates the gate conductive portion 44 from the semiconductor substrate 10. The gate conductive portion 44 is formed of polysilicon doped with impurities, or the like.

The gate conductive portion 44 may be provided to be longer than the base region 14 in the depth direction. The gate trench portion 40 is covered by the interlayer dielectric film 38 for the front surface 21. When a predetermined voltage is applied to the gate conductive portion 44, a channel is formed to a surface layer being at a boundary within the base region 14 and in direct contact with the gate trench, due to an electron inversion layer.

The dummy trench portion 30 may have the same structure as the gate trench portion 40 in the XZ cross section. The dummy trench portion 30 includes a dummy trench provided in the front surface 21, a dummy dielectric film 32, and a dummy conductive portion 34. The dummy dielectric film 32 is provided to cover an inner wall of the dummy trench. The dummy dielectric film 32 may be formed of an oxide film or a nitride film. The dummy conductive portion 34 is provided to embed an inner side relative to the dummy dielectric film 32 inside the dummy trench. The upper surface of the dummy conductive portion 34 may be in the same XY plane as the front surface 21. The dummy dielectric film 32 insulates the dummy conductive portion 34 from the semiconductor substrate 10. The dummy conductive portion 34 may be formed of the same material as the gate conductive portion 44.

In the present example, the gate trench portion 40 and the dummy trench portion 30 are covered by the interlayer dielectric film 38 for the front surface 21. Note that the bottoms of the dummy trench portion 30 and the gate trench portion 40 may be formed in a curved-surface shape (a curved-line shape in the cross section) convexly downward.

The transistor section 70 has the trench bottom portion 75 of a P type which is provided to the lower end of the trench portion. The trench bottom portion 75 of the present example is provided below the accumulation region 16. In the depth direction of the semiconductor substrate 10, the lower end of the trench bottom portion 75 may be positioned below the bottom of the gate trench portion 40. In other words, the trench bottom portion 75 may cover the bottom of the gate trench portion 40.

A doping concentration of the trench bottom portion 75 is higher than the doping concentration of the drift region 18 and is lower than the doping concentration of the base region 14. The doping concentration of the trench bottom portion 75 is 1E12 cm$^{-3}$ or more and 1E13 cm$^{-3}$ or less.

In FIG. 2B, an end on the positive side in the X axis direction (diode section 80 side) of the trench bottom portion 75 matches the boundary between the cathode region 82 and the collector region 22, but may extend on the diode section 80 side relative to this, or may be positioned back in the transistor section 70.

The trench bottom portion 75 may be a floating layer which is electrically floating. In the present specification, the floating layer refers to a layer which is not electrically connected to any of electrodes such as the emitter electrode 52. With the provision of the trench bottom portion 75, the turn-on characteristic of the transistor section 70 is improved. In addition, with the provision of the trench bottom portion 75, the electric field strength in the bottom of the gate trench portion 40 is relaxed, and the avalanche capability is improved.

Figure 2C:
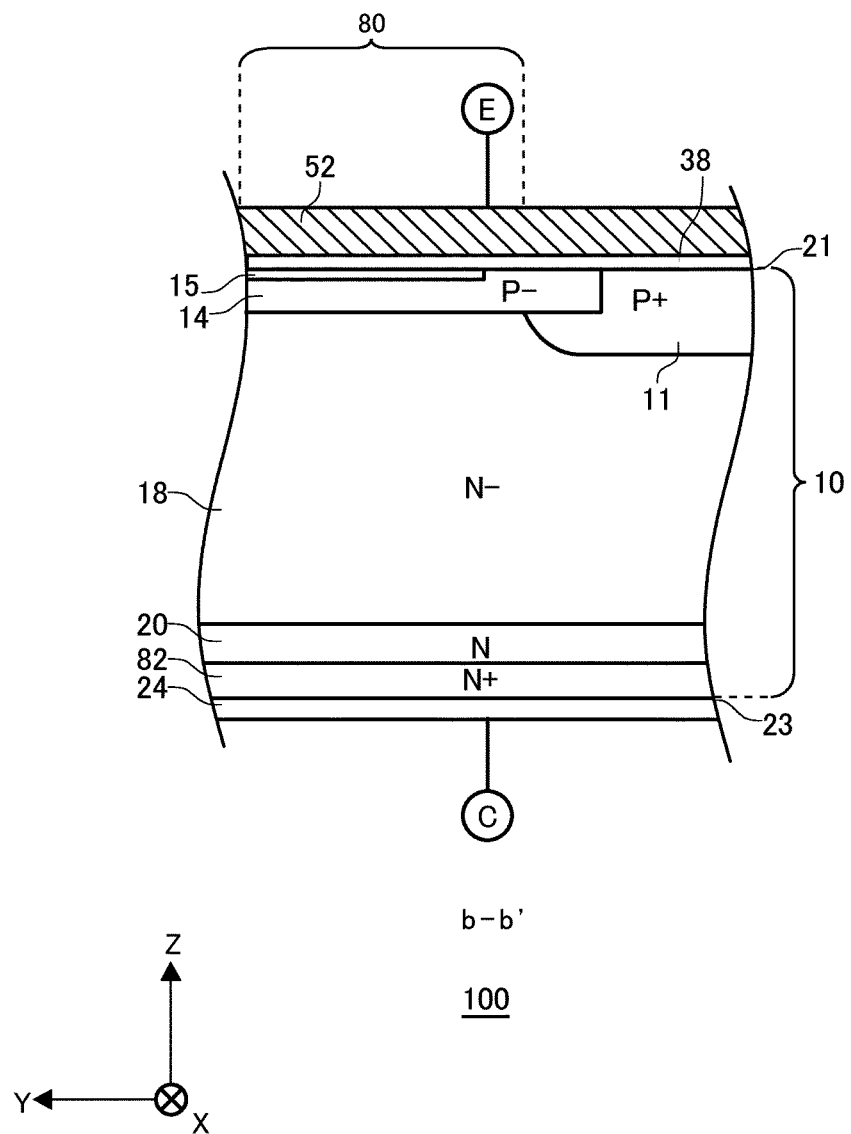
FIG. 2C illustrates a cross section b-b' in FIG. 2A.

FIG. 2C is a cross sectional view illustrating a cross section b-b' in FIG. 2A. The cross section b-b' is a YZ plane passing through the base region 14 and the contact region 15 which are provided to the diode section 80 in the vicinity of the end on the negative side in the Y axis direction of the active section 160.

In the present example, the diode section 80 is provided on the outermost side of the active section 160. In the diode section 80, the contact region 15 is provided to the front surface 21 of the semiconductor substrate 10. In addition, in the diode section 80, the base region 14 is exposed at the front surface 21 of the semiconductor substrate 10 on the outer side in the Y axis direction of the contact region 15. That is, in a top view, in the diode section 80, the contact region 15 is sandwiched by the base regions 14 in the Y axis direction.

The well region 11 is provided in the vicinity of the end on the negative side in the Y axis direction of the active section 160. The diffusion depth of the well region 11 is deeper than that of the base region 14. The well region 11 may extend in the Y axis direction to partially cover the bottom of the base region 14.

Figure 2D:
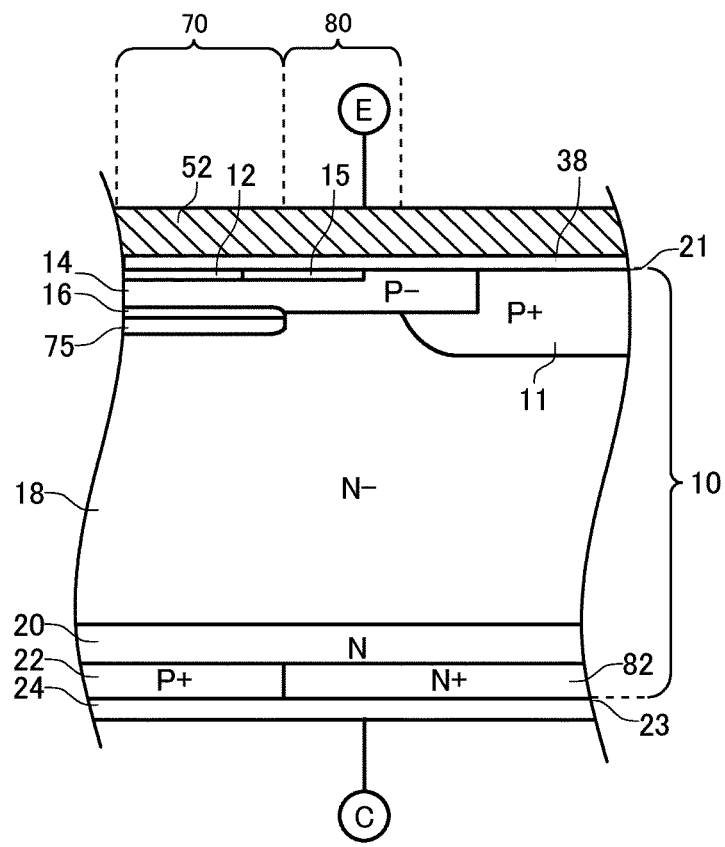
FIG. 2D illustrates a cross section c-c' in FIG. 2A.
Figure 2D:
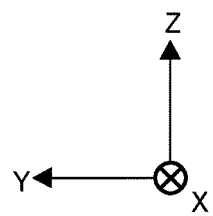

FIG. 2D illustrates a cross section c-c' in FIG. 2A. The cross section c-c' is a YZ plane passing through the emitter region 12, the base region 14, and the contact region 15 which are provided to the transistor section 70 in the vicinity of the end on the negative side in the Y axis direction of the active section 160. In addition, the cross section c-c' passes through an extension region obtaining by extending the transistor section 70 in the Y axis direction. A cathode region is provided to a lower surface of the extension region. That is, in a top view, the transistor section 70 is sandwiched by the diode sections 80 in the Y axis direction.

In the transistor section 70, the emitter region 12 and the contact region 15 are provided to the front surface 21 of the semiconductor substrate 10. In addition, in the transistor section 70, the base region 14 is exposed at the front surface 21 of the semiconductor substrate 10 on the outer side in the Y axis direction of the contact region 15. That is, in a top view, in the transistor section 70, the emitter region 12 and the contact region 15 are sandwiched by the base regions 14 in the Y axis direction.

In the transistor section 70, the accumulation region 16 and the trench bottom portion 75 are provided above the drift region 18. The trench bottom portion 75 is provided below the accumulation region 16. The trench bottom portion 75 may be provided in contact with a lower surface of the accumulation region 16. Alternatively, as will be described below, the trench bottom portion 75 may be provided to be spaced apart from the accumulation region 16, that is, may be provided with the intermediation of the drift region 18 between the accumulation region 16 and the trench bottom portion 75.

Figure 2E:
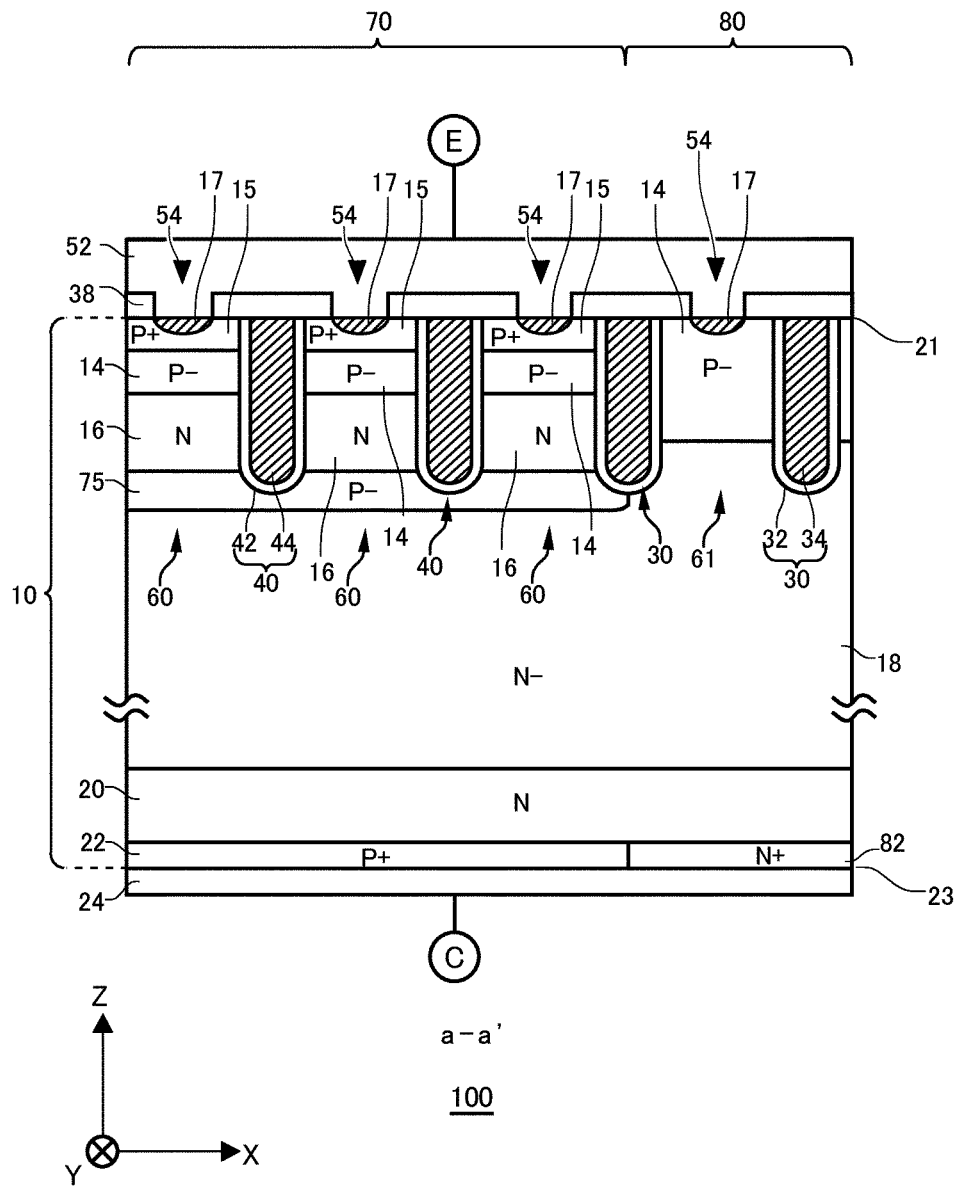
FIG. 2E illustrates another example of the cross section a-a' in FIG. 2A.

FIG. 2E illustrates another example the cross section a-a' in FIG. 2A. Similarly as in FIG. 2B, the cross section a-a' is an XZ plane passing through the contact region 15 and the base region 14, and also through the gate trench portion 40 and the dummy trench portion 30. The semiconductor device 100 in the present example has the semiconductor substrate 10, the interlayer dielectric film 38, the emitter electrode 52, and the collector electrode 24 on the cross section a-a'.

The trench bottom portion 75 provided to the lower end of the trench portion of the transistor section 70 is different from FIG. 2B as being thinner than the accumulation region 16 in the depth direction of the semiconductor substrate 10.

The lower end of the trench bottom portion 75 of the present example is positioned below the bottom of the gate trench portion 40 to cover the bottom of the gate trench portion 40. The trench bottom portion 75 may be a floating layer which is electrically floating.

In FIG. 2E, the end on the positive side in the X axis direction (diode section 80 side) of the trench bottom portion 75 matches the boundary between the cathode region 82 and the collector region 22, but may extend on the diode section 80 side relative to this, or may be positioned back in the transistor section 70. In the present example, an effect similar to that of FIG. 2B can be attained.

Figure 2F:
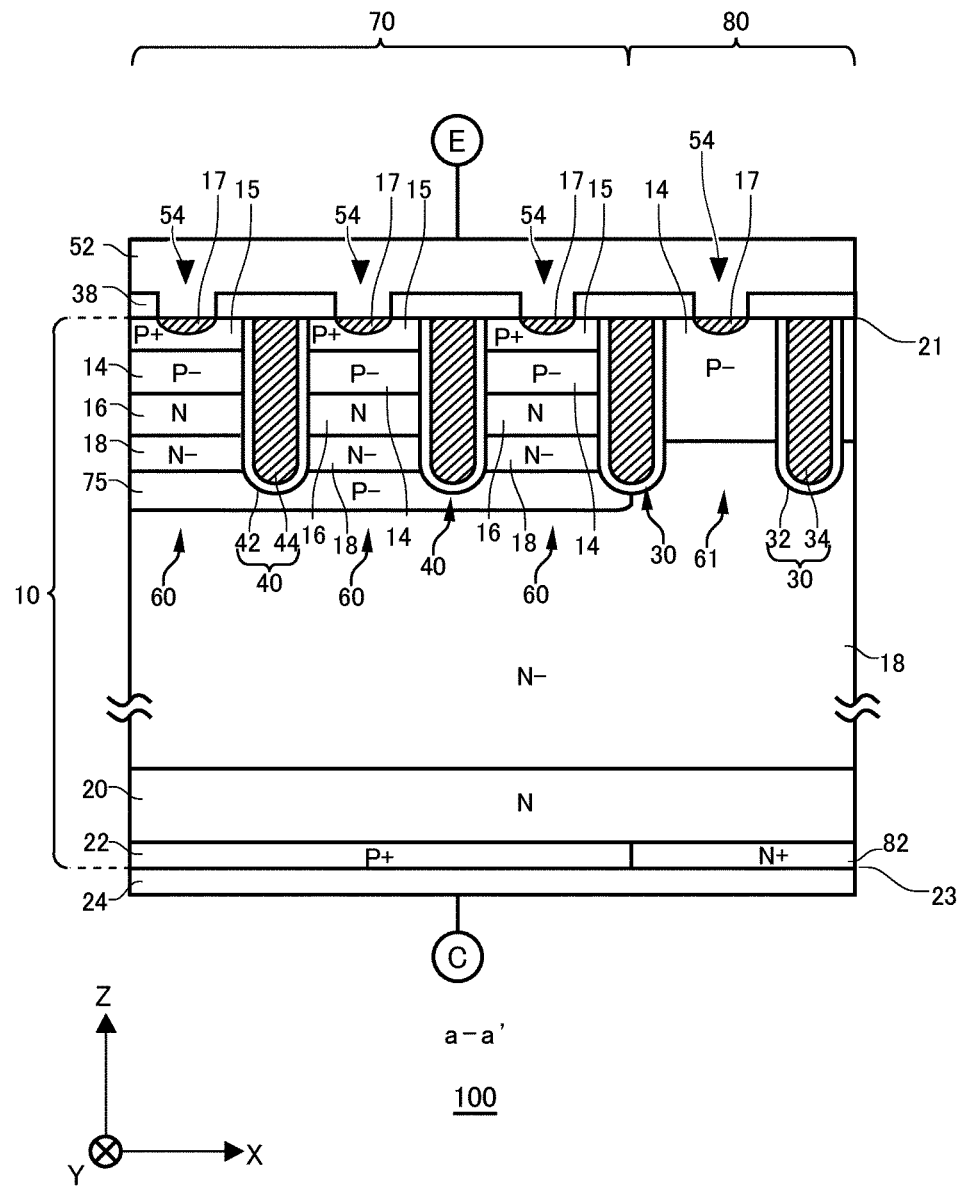
FIG. 2F illustrates another example of the cross section a-a' in FIG. 2A.

FIG. 2F illustrates another example of the cross section a-a' in FIG. 2A. The cross section a-a' is an XZ plane passing through the contact region 15 and the base region 14, and also through the gate trench portion 40 and the dummy trench portion 30 similarly as in FIG. 2B. The semiconductor device 100 in the present example has the semiconductor substrate 10, the interlayer dielectric film 38, the emitter electrode 52, and the collector electrode 24 on the cross section a-a'.

The trench bottom portion 75 is different from FIG. 2B and FIG. 2F in that the trench bottom portion is spaced apart from the accumulation region 16, that is, provided to have the intermediation of the drift region 18 between the accumulation region 16 and the trench bottom portion 75.

In the depth direction of the semiconductor substrate 10, the trench bottom portion 75 may be thinner than the accumulation region 16 or the drift region 18 between the accumulation region 16 and the trench bottom portion 75.

In FIG. 2F, the end on the positive side in the X axis direction (diode section 80 side) of the trench bottom portion 75 matches the boundary between the cathode region 82 and the collector region 22, but may extend on the diode section 80 side relative to this, or may be positioned back in the transistor section 70. In the present example, an effect similar to that of FIG. 2B can be attained.

Figure 3A:
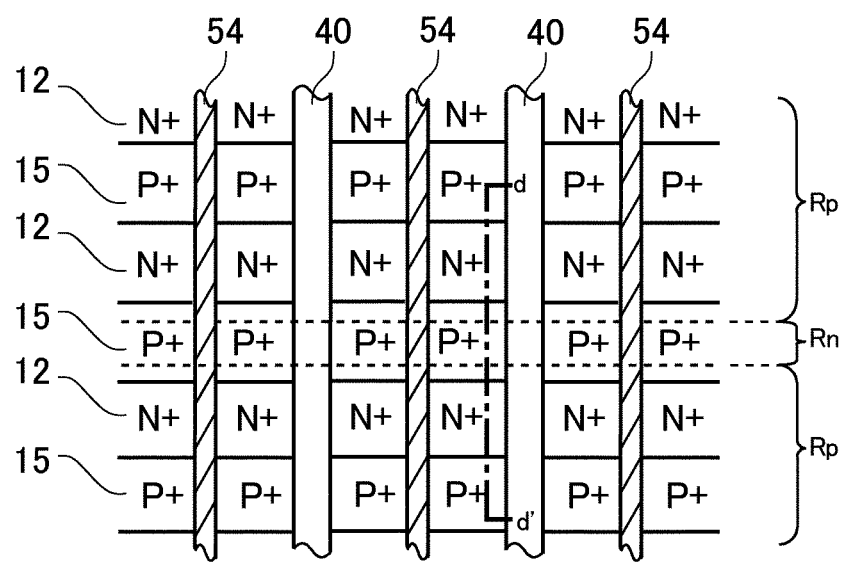
FIG. 3A illustrates an example of an arrangement of a trench bottom region Rp and an electron passage region Rn.
Figure 3A:
Figure 3B:
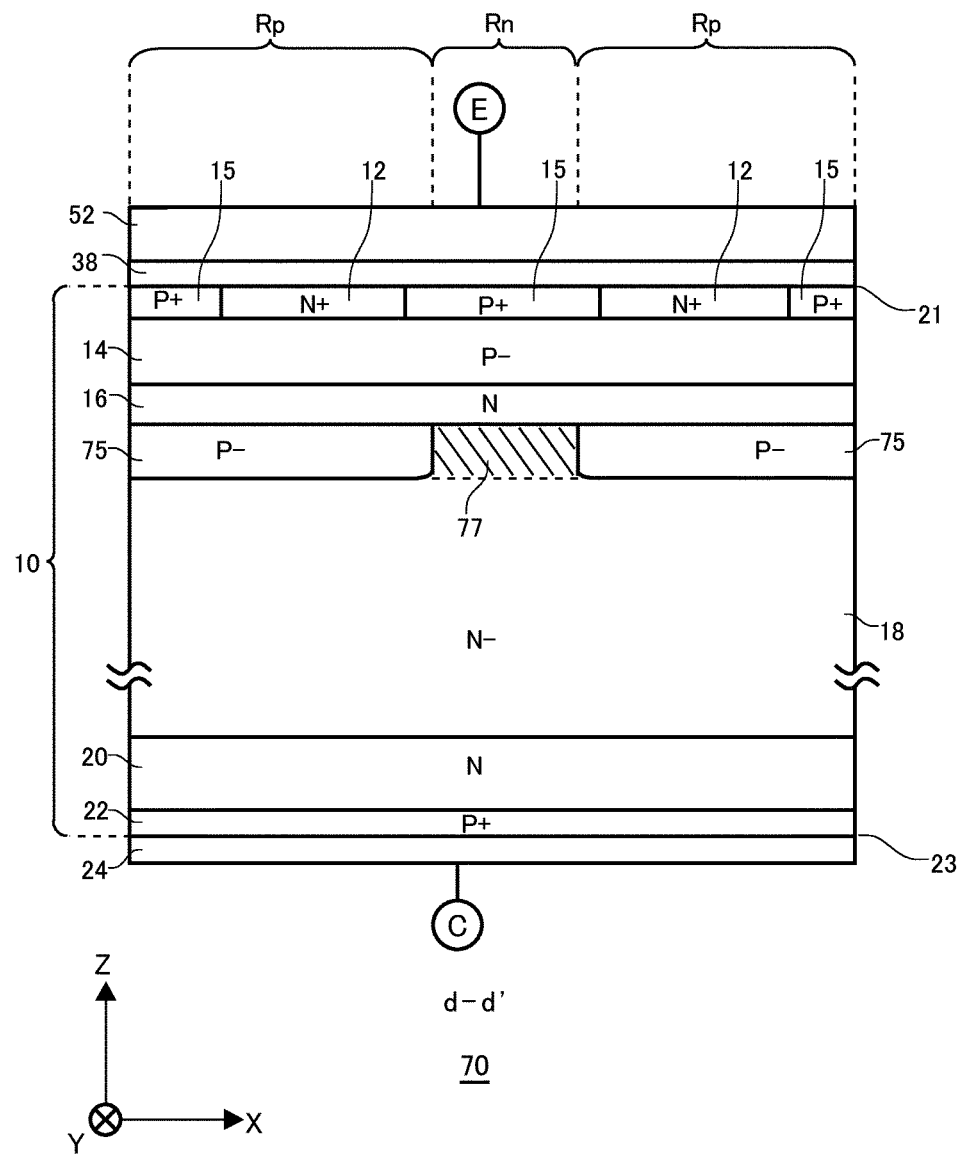
FIG. 3B illustrates a cross section d-d' in FIG. 3A.

FIG. 3A illustrates an example of an arrangement of a trench bottom region Rp and an electron passage region Rn. FIG. 3B illustrates a cross section d-d' in FIG. 3A. The trench bottom portion 75 of the present example is intermittently provided in the transistor section 70. The transistor section 70 has an electron passage portion 77 provided between the trench bottom portions 75 in a same position in the Z axis direction as those of the trench bottom portions 75. In FIG. 3B, a range of the electron passage portion 77 is represented by hatching, but the electron passage portion 77 may be a region of an N type that is the same as the drift region 18 and may be a part of the drift region 18.

In the present specification, in a top view, regions corresponding to the trench bottom portion 75 and the electron passage portion 77 are respectively referred to as the trench bottom region Rp and the electron passage region Rn. The transistor section 70 of the present example has the electron passage region Rn in which the trench bottom portion 75 is not provided in a top view.

The electron passage region Rn is provided to extend from the trench portion to the adjacent trench portion in the X axis direction. That is, as illustrated in FIG. 3A, the electron passage region Rn is provided to extend over the mesa portion in the X axis direction. Note that in FIG. 3A, only the gate trench portion 40 is represented as the trench portion, but the configuration is not limited to this. The electron passage region Rn is provided to extend over the mesa portion between two adjacent portions among the plurality of dummy trench portions 30 and gate trench portions 40 in the X axis direction.

The electron passage region Rn may extend beyond a plurality of trench portions in the X axis direction. That is, the electron passage region Rn may extend in parallel to the emitter region 12 in a top view.

In the present example, the emitter region 12 is not provided in the mesa portion of the electron passage region Rn. That is, as illustrated in FIG. 3B, the emitter region 12 is not provided above the electron passage portion 77, and the trench bottom portion 75 is provided below the emitter region 12. As illustrated in FIG. 3A, the electron passage region Rn is provided such that the end in the Y axis direction is positioned inside the contact region 15 in a top view.

In a state where the trench bottom region Rp is provided in the entire transistor section 70, a transient resistance increases until a potential of the trench bottom portion 75 rises when the transistor section 70 is turned on, so that there is a risk that an on-resistance worsens.

In the present example, when the transistor section 70 is turned on, electrons from the emitter region 12 first pass through the electron passage portion 77 and move towards the collector region 22. Subsequently, when holes from the collector region 22 are accumulated in the trench bottom portion 75, electrons also pass through the trench bottom portion 75 for achieving continuity. In this manner, since the transistor section 70 has the electron passage region Rn, the increase of the transient resistance when the transistor section 70 is turned on is suppressed, and the on-resistance is improved.

In the electron passage portion 77, avalanche is likely to occur because of current crowding. However, in the present example, since the emitter region 12 is not provided in the mesa portion of the electron passage region Rn, a probability that latch-up occurs in the electron passage portion 77 can be reduced. In this manner, in the present example, since the trench bottom portion 75 is provided below the emitter region 12, while the turn-on characteristic is improved, the on-resistance can be improved.

Figure 4A:
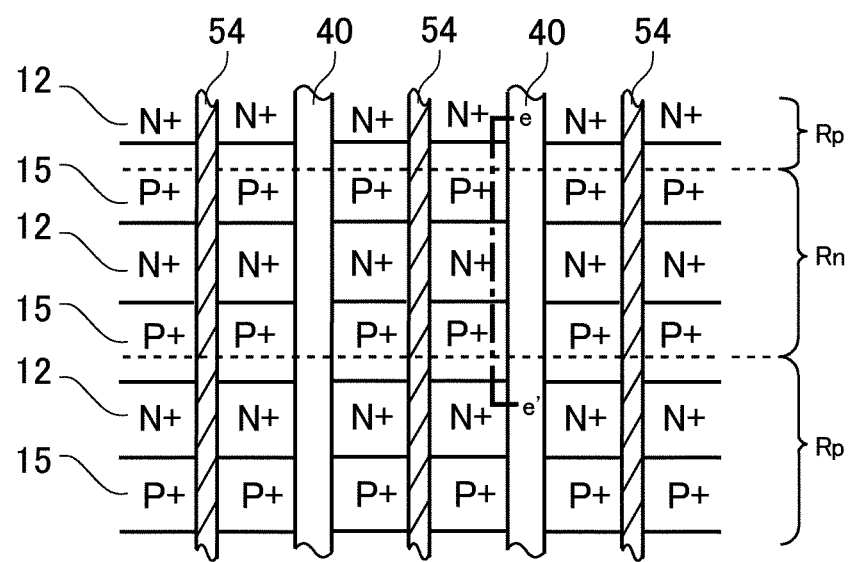
FIG. 4A illustrates an example of the arrangement of the trench bottom region Rp and the electron passage region Rn.
Figure 4A:
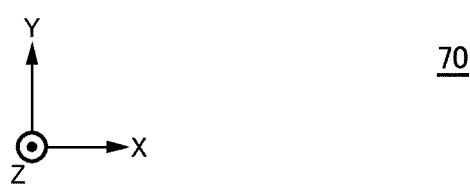
Figure 4B:
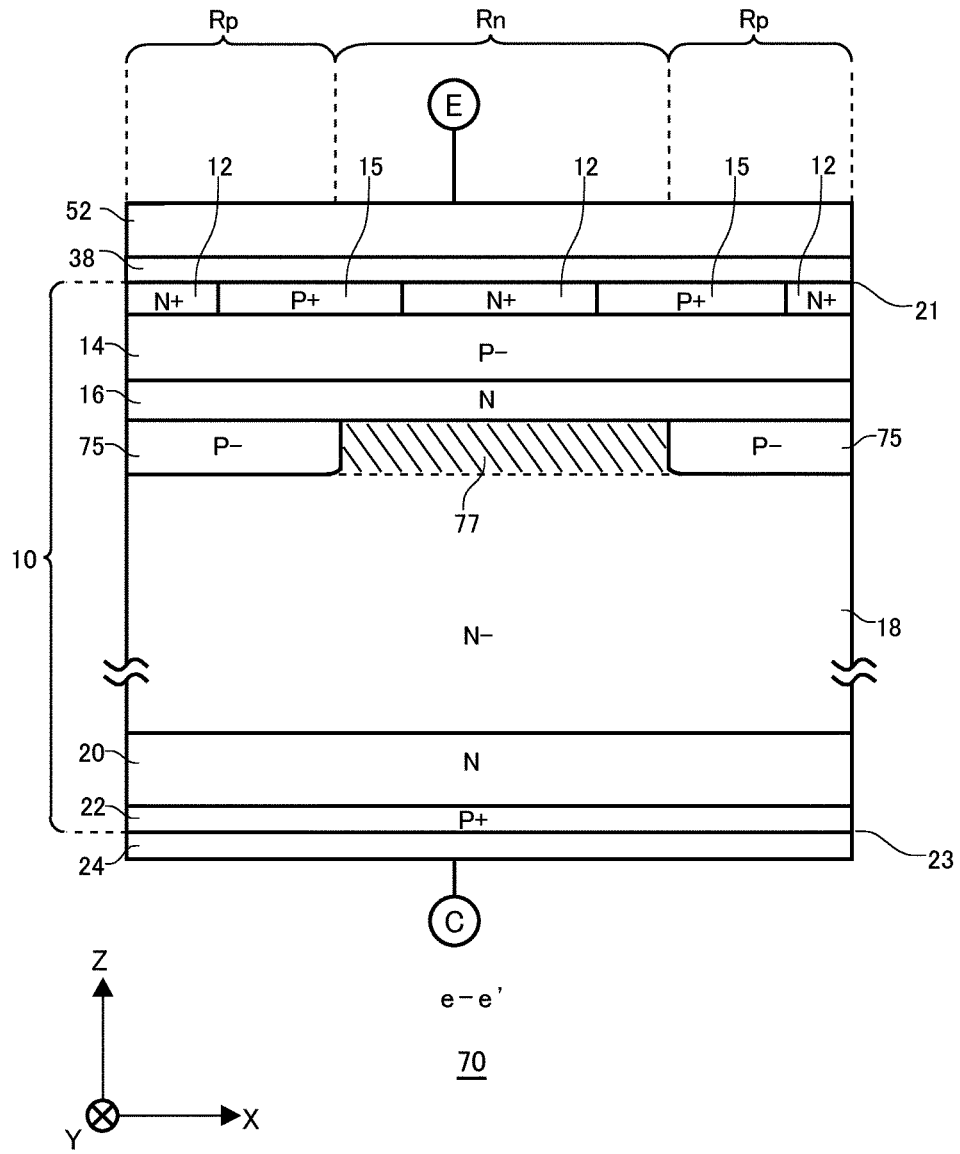
FIG. 4B illustrates a cross section e-e' in FIG. 4A.

FIG. 4A illustrates an example of the arrangement of the trench bottom region Rp and the electron passage region Rn. FIG. 4B illustrates a cross section e-e' in FIG. 4A. Similarly as in FIG. 3A and FIG. 3B, the trench bottom portion 75 of the present example is intermittently provided in the transistor section 70, and the transistor section 70 has the electron passage portion 77 provided between the trench bottom portions 75 in a same position in the Z axis direction as those of the trench bottom portions 75.

Similarly as in FIG. 3A and FIG. 3B, the electron passage region Rn of the present example is provided to extend from the trench portion to the adjacent trench portion in the X axis direction. That is, the electron passage region Rn is provided to extend over the mesa portion in the X axis direction. In addition, the electron passage region Rn may extend beyond a plurality of trench portions in the X axis direction. That is, the electron passage region Rn may extend to be orthogonal to the trench portion in a top view.

As being different from FIG. 3A and FIG. 3B, at least the emitter region 12 is provided in the electron passage region Rn of the present example. That is, the electron passage portion 77 is provided below any of the emitter regions 12. With this configuration, when the transistor section 70 is turned on, electrons from the emitter region 12 can reliably pass through the electron passage portion 77. In this manner, since the transistor section 70 has the electron passage region Rn, the increase of the transient resistance when the transistor section 70 is turned on is suppressed, and the on-resistance is improved.

Figure 5A:
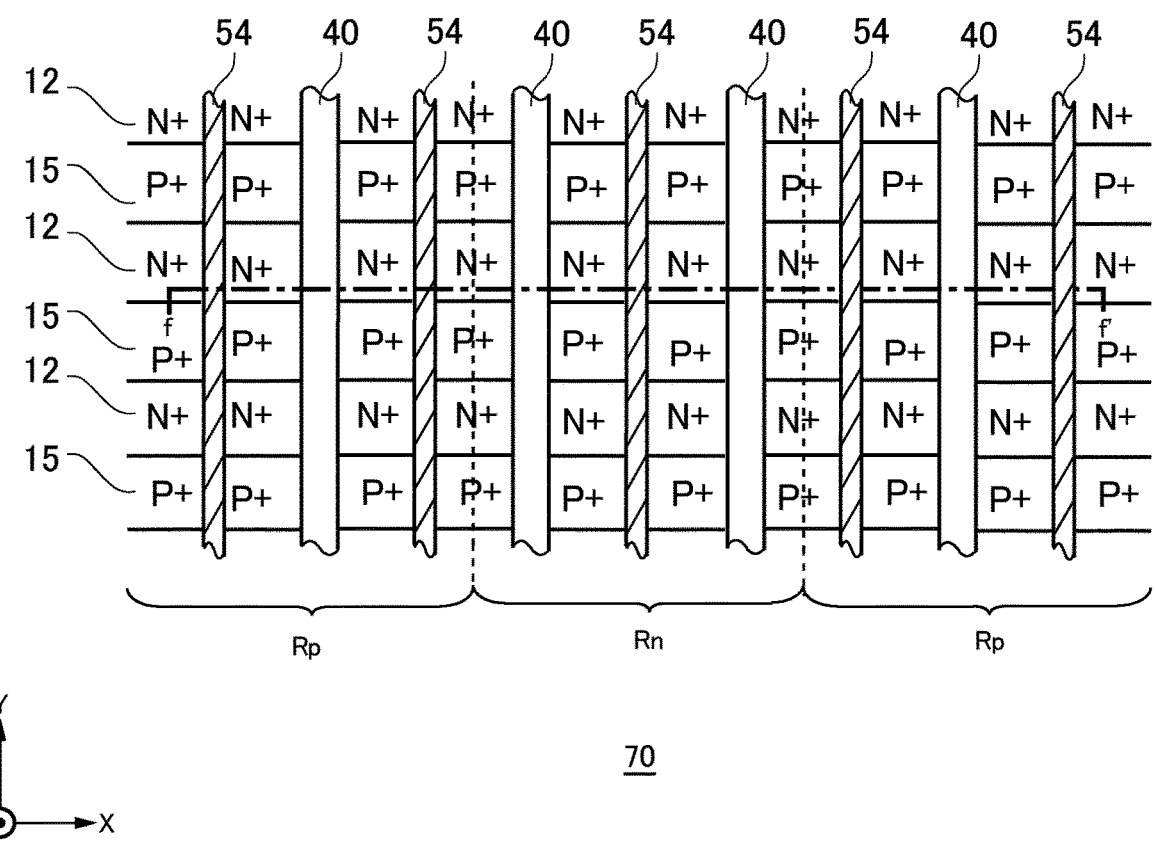
FIG. 5A illustrates an example of the arrangement of the trench bottom region Rp and the electron passage region Rn.

FIG. 5A illustrates an example of the arrangement of the trench bottom region Rp and the electron passage region Rn.

Figure 5B:
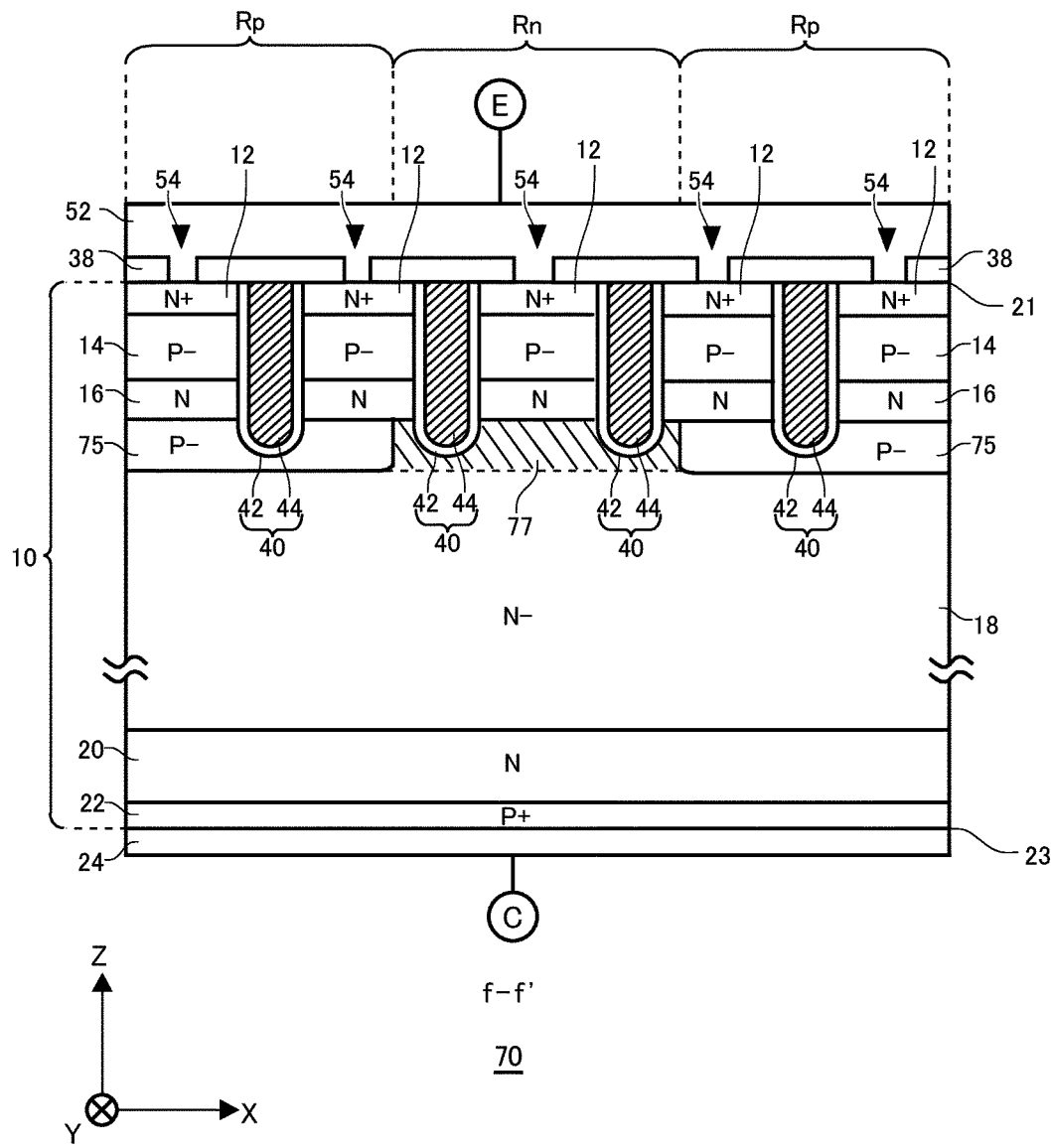
FIG. 5B illustrates a cross section f-f' in FIG. 5A.

FIG. 5B illustrates a cross section f-f' in FIG. 5A. Similarly as in FIG. 3A to FIG. 4B, the trench bottom portion 75 of the present example is intermittently provided in the transistor section 70, and the transistor section 70 has the electron passage portion 77 provided between the trench bottom portions 75 in a same position in the Z axis direction as those of the trench bottom portions 75.

As being different from FIG. 3A to FIG. 4B, in the present example, the trench bottom region Rp and the electron passage region Rn are alternately provided in the X axis direction. That is, as illustrated in FIG. 5A, the trench bottom region Rp and the electron passage region Rn are alternately provided to extend in parallel to the gate trench portion 40 in a top view.

At least the gate trench portion 40 may be provided in the electron passage region Rn. That is, the electron passage portion 77 is provided below any of the gate trench portions 40. When a channel is formed in the gate trench portion 40 provided in the electron passage region Rn, electrons from the channel can reliably pass through the electron passage portion 77 below the gate trench portion 40. In this manner, since the transistor section 70 has the electron passage region Rn, the increase of the transient resistance when the transistor section 70 is turned on is suppressed, and the on-resistance is improved.

While the present invention has been described by way of the embodiments above, the technical scope of the present invention is not limited to the above described embodiments. It is apparent to persons skilled in the art that various alterations or improvements can be made to the above described embodiments. It is also apparent from the description of the claims that embodiments added with such alterations or improvements can be included in the technical scope of the present invention.

The operations, procedures, steps, and stages of each process performed by a device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: semiconductor substrate; 11: well region; 12: emitter region; 14: base region; 15: contact region; 16: accumulation region; 17: plug region; 18: drift region; 20: buffer region; 21: front surface; 22: collector region; 23: back surface; 24: collector electrode; 25: connection portion; 29: linear portion; 30: dummy trench portion; 31: edge portion; 32: dummy insulating film; 34: dummy conductive portion; 38: interlayer dielectric film; 39: linear portion; 40: gate trench portion; 41: edge portion; 42: gate insulating film; 44: gate conductive portion; 48: gate runner; 49: contact hole; 50: gate metal layer; 52: emitter electrode; 54: contact hole; 56: contact hole; 60: mesa portion; 61: mesa portion; 70: transistor section; 75: trench bottom portion; 77: electron passage portion; 80: diode section; 82: cathode region; 92: guard ring; 100: semiconductor device; 102: end side; 160: active section; 190: edge termination structure section.

What is claimed is:

1. A semiconductor device provided with a transistor section, the semiconductor device comprising:
   a drift region of a first conductivity type which is provided in a semiconductor substrate;
   a plurality of trench portions extending from a front surface of the semiconductor substrate to the drift region;
   an emitter region of the first conductivity type which has a doping concentration higher than a doping concentration of the drift region and which is provided to extend from a trench portion to an adjacent trench portion among the plurality of trench portions on the front surface of the semiconductor substrate; and
   a trench bottom portion of a second conductivity type which is provided to a lower end of the trench portion, wherein
   the transistor section has an electron passage region in which the trench bottom portion is not provided in a top view.

2. The semiconductor device according to claim 1, wherein
   the electron passage region is provided to extend from a trench portion to an adjacent trench portion among the plurality of trench portions in a trench array direction.

3. The semiconductor device according to claim 2, wherein
   the electron passage region extends beyond a plurality of trench portions in the trench array direction.

4. The semiconductor device according to claim 2, wherein
   the emitter region is not provided in a mesa portion of the electron passage region.

5. The semiconductor device according to claim 2, wherein
   the trench bottom portion is provided below the emitter region.

6. The semiconductor device according to claim 2, further comprising:
   a contact region of the second conductivity type which is provided to a front surface of the semiconductor substrate; and
   an electron passage portion provided between the trench bottom portions in a same position in a depth direction as that of the trench bottom portion, wherein
   in a trench extending direction, a width of the electron passage portion is smaller than a width of the contact region, and
   the electron passage portion is provided below the contact region.

7. The semiconductor device according to claim 2, further comprising:
   a contact region of the second conductivity type which is provided to a front surface of the semiconductor substrate, wherein
   the emitter region and the contact region are alternately provided in a trench extending direction,
   the transistor section has a trench bottom region in which the trench bottom portion is formed in a top view,
   the trench bottom region and the electron passage region are alternately provided in a trench extending direction, and
   at least the emitter region is provided in the electron passage region.

8. The semiconductor device according to claim 2, wherein the transistor section has a trench bottom region in which the trench bottom portion is formed in a top view, and the trench bottom region and the electron passage region are alternately provided in a trench array direction.

9. The semiconductor device according to claim 1, wherein the emitter region is not provided in a mesa portion of the electron passage region.

10. The semiconductor device according to claim 1, wherein the trench bottom portion is provided below the emitter region.

11. The semiconductor device according to claim 1, further comprising:

a contact region of the second conductivity type which is provided to a front surface of the semiconductor substrate; and an electron passage portion provided between the trench bottom portions in a same position in a depth direction as that of the trench bottom portion, wherein in a trench extending direction, a width of the electron passage portion is smaller than a width of the contact region, and the electron passage portion is provided below the contact region.

12. The semiconductor device according to claim 1, further comprising:

a contact region of the second conductivity type which is provided to a front surface of the semiconductor substrate, wherein the emitter region and the contact region are alternately provided in a trench extending direction, the transistor section has a trench bottom region in which the trench bottom portion is formed in a top view, the trench bottom region and the electron passage region are alternately provided in a trench extending direction, and at least the emitter region is provided in the electron passage region.

13. The semiconductor device according to claim 1, wherein the transistor section has a trench bottom region in which the trench bottom portion is formed in a top view, and the trench bottom region and the electron passage region are alternately provided in a trench array direction.

14. The semiconductor device according to claim 13, wherein at least a gate trench portion to be applied with a gate voltage is provided in the electron passage region.

15. The semiconductor device according to claim 1, wherein the trench bottom portion is electrically floating.

16. The semiconductor device according to claim 1, wherein a doping concentration of the trench bottom portion is $1E12$ $cm^{-3}$ or more and $1E13$ $cm^{-3}$ or less.

17. The semiconductor device according to claim 1, further comprising:

an accumulation region of the first conductivity type which is provided above the drift region.

18. The semiconductor device according to claim 17, wherein the drift region intervenes between the accumulation region and the trench bottom portion.

19. The semiconductor device according to claim 17, wherein the trench bottom portion is thinner than a the accumulation region in a depth direction of the semiconductor substrate.

20. The semiconductor device according to claim 1, comprising:

a transistor section and a diode section, wherein the trench bottom portion is provided to only the transistor section.

* * * * *